(12) United States Patent
Shikida et al.

(10) Patent No.: US 7,814,870 B2
(45) Date of Patent: *Oct. 19, 2010

(54) WARMING-UP DEVICE OF INTERNAL COMBUSTION ENGINE

(75) Inventors: Takasuke Shikida, Okazaki (JP); Ryu Hamaguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 350 days.

This patent is subject to a terminal disclaimer.

(21) Appl. No.: 12/064,406

(22) PCT Filed: Aug. 22, 2006

(86) PCT No.: PCT/JP2006/316377

§ 371 (c)(1),
(2), (4) Date: Feb. 21, 2008

(87) PCT Pub. No.: WO2007/023793

PCT Pub. Date: Mar. 1, 2007

(65) Prior Publication Data

US 2009/0126667 A1 May 21, 2009

(30) Foreign Application Priority Data

Aug. 22, 2005 (JP) ............................. 2005-239868

(51) Int. Cl.
*F01P 11/02* (2006.01)
*B60H 1/03* (2006.01)

(52) U.S. Cl. ............................. 123/41.14; 123/142.5 R
(58) Field of Classification Search .............. 123/41.14, 123/142.5 R
See application file for complete search history.

(56) References Cited

FOREIGN PATENT DOCUMENTS

| EP | 1 918 578 A1 | 5/2008 |
|---|---|---|
| EP | 1 925 816 A1 | 5/2008 |
| JP | 61 185676 | 8/1986 |
| JP | 63 105219 | 5/1988 |
| JP | 2-171594 | 7/1990 |
| JP | 5-296017 | 11/1993 |
| JP | 06-257973 | 9/1994 |
| JP | 6 264852 | 9/1994 |
| JP | 11 182393 | 7/1999 |
| JP | 2001-183083 | 7/2001 |

*Primary Examiner*—Noah Kamen
(74) *Attorney, Agent, or Firm*—Oblon, Spivak, McClelland, Maier & Neustadt, L.L.P.

(57) ABSTRACT

A warming-up device of an internal combustion engine includes a latent heat storage material accommodated in the interior of the internal combustion engine and radiating heat based on a phase change, and a nucleation device within the heat storage material and operating to prompt the phase change of the heat storage material under a supercooled state. The nucleation device is operated based on an oscillation generated at a time of starting the engine. As a result, the warming-up device of the internal combustion engine dispenses with a machining operation for forming a through port passing through the interior and an outside of the heat storage material, a seal around the through port and an electric circuit, and the device is inexpensive and has a simple structure.

6 Claims, 8 Drawing Sheets

(a)

(b)

(c)

(d)

WARMING-UP DEVICE OF INTERNAL COMBUSTION ENGINE

FIELD OF THE INVENTION

The present invention relates to a warming-up device rapidly increasing a temperature in the interior of an internal combustion engine so as to warm up the engine at a time of starting the engine.

DISCUSSION OF THE BACKGROUND

In general, if the internal temperature of an internal combustion engine, particularly a cylinder wall temperature or a combustion chamber temperature becomes low at a time of starting the internal combustion engine, a friction loss with respect to a motion of a piston is increased, and the composition of exhaust gas is deteriorated.

Accordingly, a warming-up device has been conventionally proposed that is structured such that a latent heat storage material is accommodated in the interior of an internal combustion engine, heat generated by the operation of the internal combustion engine is stored in the heat storage material, and the heat stored in the heat storage material is radiated at the next start of the internal combustion engine so as to promote the warming-up of the internal combustion engine (for example, refer to Patent Document 1).

The warming-up device is provided with a nucleation device having a pair of electrodes inserted to the interior of the heat storage material, and prompts a phase change in the heat storage material under a supercooled state so as to radiate heat from the heat storage material, by applying an electric voltage to the electrodes from the outside so as to operate the nucleation device.

However, in the conventional structure, since the phase change is prompted in the heat storage material by applying an electric voltage to the electrodes, it is necessary to provide a through port for inserting the electrodes to the interior of the heat storage material from the outside, and an electric circuit for applying the electric voltage to the electrodes, and the like. Accordingly, a machining operation for forming the through port passing through the interior of the heat storage material and the outside is necessary, and a seal around the through port is also necessary. Further, since the electric circuit is necessary, the costs inevitably increase.

Patent Document 1: Japanese Laid-Open Patent Publication No. 11-182393

SUMMARY OF THE INVENTION

An objective of the present invention is to provide a warming-up device of an internal combustion engine that dispenses with a machining operation for forming a through port connecting the interior of a heat storage material with the outside, a seal around the through port, and an electric circuit, and has an inexpensive and simple structure.

In order to achieve the foregoing objective, the present invention provides a warming-up device of an internal combustion engine provided with a latent heat storage material, which is accommodated in the interior of the internal combustion engine and radiates heat on the basis of a phase change, and a nucleation device, which is provided within the heat storage material and operates in such a manner as to prompt a phase change of the heat storage material under a supercooled state. The nucleation device is operated by an oscillation generated at a time of starting the engine.

BRIEF DESCRIPTION OF THE DRAWINGS

FIGS. 2(a), 2(b) and 2(c) are views of a nucleation device of the warming-up device in accordance with the first embodiment of the present invention, in which FIG. 2(a) is a cross-sectional view showing a constraint state by a release mechanism at a time of moving to a warm shaft position on the basis of an inflation of a thermowax, FIG. 2(b) is a cross-sectional view showing a state in preparation for an operation in the constraint state by the release mechanism by deflating the thermowax, and FIG. 2(c) is a cross-sectional view showing an operating state on the basis of a cancellation of the release mechanism;

FIGS. 3(a), 3(b), 3(c) and 3(d) are views of a nucleation device of a warming-up device in accordance with a second embodiment of the present invention, in which FIG. 3(a) is a cross-sectional view showing a state in preparation for an operation in a constraint state by the release mechanism by deflating the thermowax, FIG. 3(b) is a cross-sectional view showing a state immediately before operating on the basis of a cancellation of the release mechanism, FIG. 3(c) is a cross-sectional view showing an operating state on the basis of the cancellation of the release mechanism, and FIG. 3(d) is a cross-sectional view showing a constraint state by the release mechanism in a state of being moved to a warm hammer position on the basis of an inflation of the thermowax;

DETAILED DESCRIPTION OF THE PREFERRED EMBODIMENTS

A description will be in detail given below of a best mode for carrying out the present invention with reference to the accompanying drawings.

Figure 1:
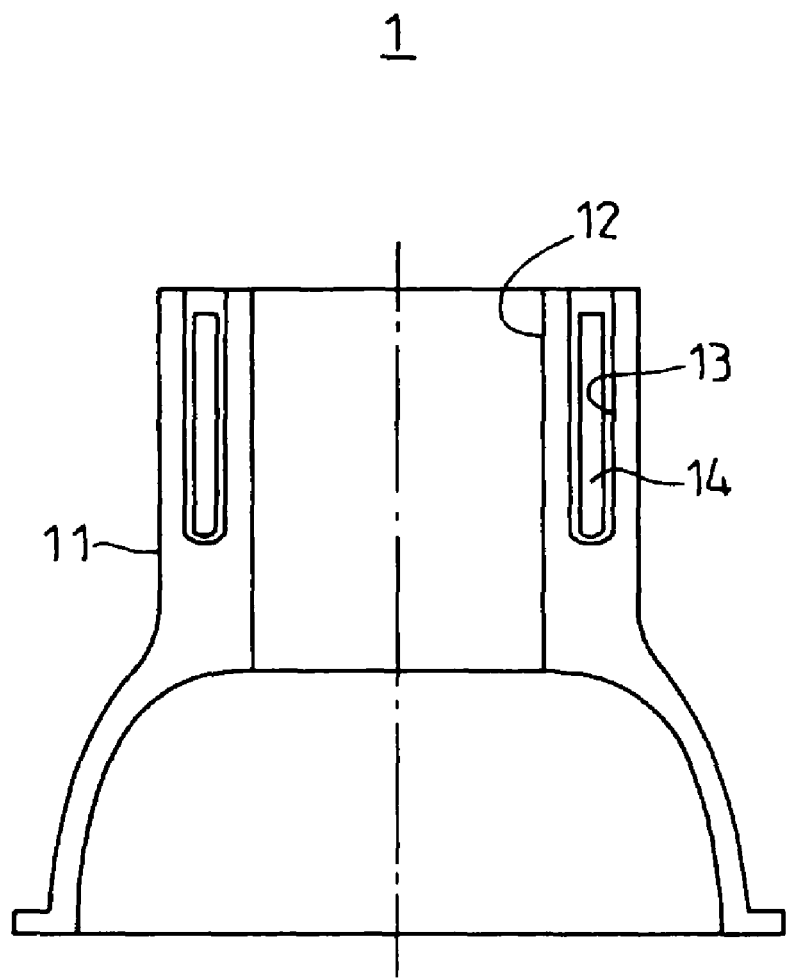
FIG. 1 is a cross-sectional view of an internal combustion engine provided with a warming-up device in accordance with a first embodiment of the present invention as seen from a direction of a crankshaft.

FIG. 1 is a cross-sectional view of an internal combustion engine provided with a warming-up device in accordance with a first embodiment as seen from a direction of a crankshaft. A water jacket 13 is formed in a cylinder block 11 of an internal combustion engine 1 so as to surround a cylinder 12. A heat storage material accommodating container 14 filled with a latent heat storage material X, for example, constituted by a sodium acetate trihydrate ($CH_3COONa \cdot 3H_2O$) is accommodated within the water jacket 13. The heat storage material accommodating container 14 is structured by a synthetic resin having a high coefficient of thermal conductivity. The sodium acetate trihydrate serving as the heat storage material X has a characteristic that it comes to a supercooled state while storing a latent heat to about minus 20° C. to minus 30° C. without generating a phase change from a liquid phase to a solid phase even by being cooled to a temperature state equal to or less than a melting point (58° C.) from a temperature state more than the melting point. Further, a nucleation device 2 operating so as to prompt the phase change of the heat storage material X is arranged in the interior of the heat storage material accommodating container 14. If the nucleation device 2 is operated by oscillation generated at a time of starting the internal combustion engine 1 at a time when a temperature of the internal combustion engine 1 has been lowered and the heat storage material X is under the supercooled state, the phase change to the solid phase of the heat storage material X is prompted, and the latent heat is quickly discharged. Further, the heat storage material X finishes discharging the latent heat on the basis of the phase change to the solid phase so as to be exposed to the heat from the cylinder block 11, and changes its phase from the temperature state more than the melting point to the liquid phase so as to store the latent heat.

The nucleation device 2 is provided with: a cylindrical piston member 21 with a closed end supported at one end in a direction of an axis m (a left end in FIG. 2) in an substantially cylindrical outer frame 20, so as to be slidable in the direction of the axis m; a small-diameter tubular member 21a integrally attached to an open end open at an opposite end (a right side in FIG. 2), which is opposite to the one end, in the direction of the axis m of the piston member 21; a inner tube member 22 with a closed end supported so as to be slidable in the direction of the axis m at the opposite end in the direction of the axis m (hereinafter, refer simply to as the opposite end) within the outer frame 20; a shaft 23 structured such that a large-diameter head portion 23a is slidably supported to the interior of the inner tube member 22, and a small-diameter shaft portion 23b is integrally coupled to an end of the head portion 23a corresponding to the one end and is movable forward and backward in the direction of the axis m; a first urging spring 24a provided in a compressed manner between the end surface of the piston member 21 corresponding to the one end and the outer frame 20, and urges the piston member 21 toward the opposite end; a second urging spring 24b provided in a compressed manner between an end surface of the inner tube member 22 corresponding to the opposite end and the outer frame 20, and urges the inner tube member 22 toward the one end; and a third urging spring 24c provided in a compressed manner within the inner tube member 22, and urges the shaft 23 toward the one end.

An internal space 21X within the piston member 21 and an internal space 21Y within the tubular member 21a are partitioned by an elastically deformable rubber member 21b, a thermowax 25a fills the internal space 21X within the piston member 21, and a highly viscous substance 25b fills the internal space 21Y within the tubular member 21a. The end of the internal space 21Y corresponding to the opposite end within the tubular member 21a is sealed by a seal member 23c integrally provided in and end portion of the shaft portion 23b corresponding to the one end, thereby preventing the highly viscous substance 25b from leaking out from the interior (the internal space 21Y) of the tubular member 21a. Further, the thermowax 25a within the piston member 21 is structured such as to push out the end portion of the shaft portion 23b corresponding to the one end toward the opposite end via the highly viscous substance 25b on the basis of an increase of volume at a warm time (for example, 60° C. or higher), thereby moving the shaft 23 to a position at the warm time of the thermowax 25a, that is, a warm shaft position (a position shown in FIG. 2(a)). On the other hand, the thermowax 25a within the piston member 21 pulls back the end portion of the shaft portion 23b corresponding to the one end toward the one end with the highly viscous substance 25b on the basis of a reduction of volume, as shown in FIG. 2(b) at a cold time (for example, 50° C. or less), thereby moving the shaft 23 to a position at the cold time of the thermowax 25a, that is, a cold shaft position (a position shown in FIG. 2(b)).

Figure 2:
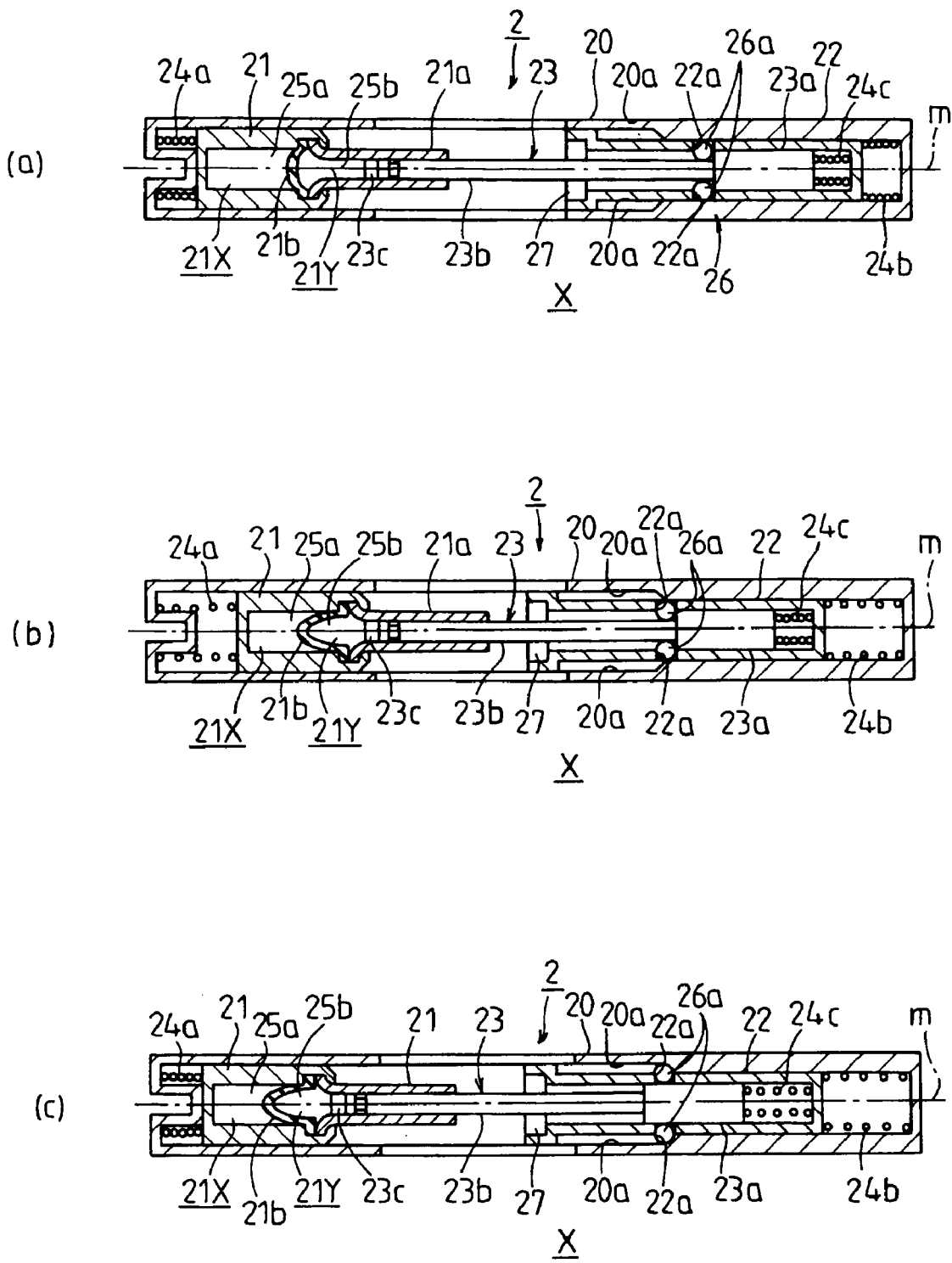

Further, the nucleation device 2 is provided with a release mechanism 26 constraining the shaft 23 to the warm shaft position in a releasable state even at the cold time of the thermowax 25a. The release mechanism 26 is provided with: the third urging spring 24c urging the shaft 23 toward the cold shaft position side (the left side in FIG. 2); a locking ball 26a slidably supported within a through hole 22a passing through a portion near an substantially center portion in the direction of the axis m of the inner tube member 22 in a radial direction which is orthogonal to the axis m and locking the shaft 23 to the warm shaft position on the basis of an engagement with the head portion 23a; and a canceling groove 20a provided on an inner peripheral surface of the outer frame 20, and canceling an engagement with the head portion 23a by letting out the locking ball 26a to the outside in the radial direction via the through hole 22a on the basis of an oscillation generated at a time of starting the internal combustion engine 1, as shown in FIG. 2(c).

Further, the portion near the substantially center portion in the direction of the axis m of the outer frame 20 is formed as a fence shape so as to communicate with the interior of the heat storage material accommodating container 14, and directly comes into contact with the heat storage material X. Further, to one end of the inner tube member 22 corresponding to the one end is attached an annular rubber scraping member 27 coming close contact with the shaft portion 23b of the shaft 23 and scraping a surface of the shaft portion 23b at a time when the shaft 23 moves forward and backward in the direction of the axis m. Further, in the release mechanism 26, if the engagement between the locking ball 26a and the head portion 23a is canceled by the oscillation generated at a time of starting the internal combustion engine 1, the surface of the shaft portion 23b is scraped by the rubber scraping member 27 at a time when the shaft 23 released from the warm shaft position moves forward to the cold shaft position, and the nucleation device 2 is operated in such a manner as to nucleate the heat storage material X by directly bringing a newly scraped generated surface into contact with the heat storage material X in the supercooled state. A phase change to a solid phase of the heat storage material X is prompted, and a latent heat is quickly discharged to the cylinder block 11. In this case, the nucleation device 2 is attached by extending the axis m substantially in a vertical direction in such a manner as to be oriented to a direction facilitating the cancellation of the constraint at the warm shaft position of the shaft 23 by the release mechanism 26 on the basis of the oscillation generated at a time of starting the internal combustion engine 1, that is, a direction facilitating cancellation of the engagement between the locking ball 26a and the head portion 23a on the basis of the oscillation generated at a time of starting the internal combustion engine 1.

Further, if the heat storage material X incorporate the heat from the cylinder block 11 thereinto so as to be at a temperature more than the melting point (58° C.), from a state in which the nucleation device 2 changes the phase of the heat storage material X to the solid phase so as to discharge the latent heat after the operation of moving forward the shaft 23 to the cold shaft position, as shown in FIG. 2(c), the volume of the thermowax 25a within the piston member 21 is increased so as to push the end portion of the shaft portion 23b corresponding to the one end toward the opposite end with the highly viscous substance 25b and move the shaft 23 to the warm shaft position, as shown in FIG. 2(a). At this time, the locking ball 26a is expelled from the canceling groove 20a in the inner peripheral surface of the outer frame 20 so as to be returned into the through hole 22a of the inner tube member 22, the head portion 23a of the shaft 23 moved to the warm shaft position and the locking ball 26a are engaged, and the constrain at the warm shaft position of the shaft 23 is achieved by the release mechanism 26. The constraint at the warm shaft position of the shaft 23 by the release mechanism 26 is continuously carried out even if the heat storage material X is lowered to a temperature equal to or lower than 50° C. and the volume of the thermowax 25a within the piston member 21 is reduced so as to act to pull back the end portion of the shaft portion 23b corresponding to the one end toward the one end with the highly viscous substance 25b. As shown in FIG. 2(b), the piston member 21 and the inner tube member 22 are held in a floating state balanced by the urging force of the first and second urging springs within the outer frame 20, in a state of being integrally coupled via the shaft 23, and are held in an operation standby state so that the nucleation device 2 is operated on the basis of the oscillation generated at a time of starting the internal combustion engine 1.

Accordingly, in the first embodiment, since the nucleation device 2 operating on the basis of the oscillation generated at a time of starting the internal combustion engine 1 is provided in the interior of the heat storage material accommodating container 14 accommodating the heat storage material X, the through port for inserting the electrode into the heat storage material accommodating container accommodating the heat storage material, the electric circuit for applying the electric voltage to the electrode and the like are not necessary as is different from the structure which prompts the phase change of the heat storage material by applying the electric voltage to the electrode inserted to the heat storage material under the supercooled state from the external portion. Accordingly, the machining operation for forming the through port in the heat storage material accommodating container 14 and the seal around the through port are not necessary, and it is possible to provide the warming-up device 1 which is inexpensive and has a simple structure.

Further, the nucleation device 2 is provided with the release mechanism 26 constraining the shaft 23 at the warm shaft position (the position shown in FIG. 2(b)) even at the cold time of the thermowax 25a. If the engagement between the locking ball 26a of the release mechanism 26 and the head portion 23a of the shaft 23 is cancelled by the oscillation generated at a time of starting the internal combustion engine 1, the surface of the shaft portion 23b is scraped by the rubber scraping member 27 at a time when the shaft 23 released from the warm shaft position moves forward to the cold shaft position, the nucleation device 2 is operated in such a manner as to prompt the phase change to the solid phase of the heat storage material X under the supercooled state by directly bringing the newly scraped surface into contact with the heat storage material X, and it is possible to securely discharge the latent heat from the heat storage material X to the cylinder block 11.

Further, since the thermowax 25a within the piston member 21 pushes the end portion of the shaft portion 23b corresponding to the one end toward the opposite end with the highly viscous substance 25b so as to move the shaft 23 to the warm shaft position at a time of temperature rising on the basis of the temperature rise of the heat storage material X so as to increase the volume, the locking ball 26a expelled from the canceling groove 20a in the inner peripheral surface of the outer frame 20 is returned into the through hole 22a of the inner tube member 22 so as to be engaged with the head portion 23a of the shaft 23 ate the warm shaft position, and the shaft 23 is constrained at the warm shaft position by the release mechanism 26, it is possible to independently move the shaft 23 to the warm shaft position constrained by the release mechanism 26 by means of the thermowax 25a heated and inflated by the temperature rise of the heat storage material X, the warm shaft position of the shaft 23 constrained by the release mechanism 26 is easily obtained by utilizing the heat of the internal combustion engine 1, and it is possible to provide the nucleation device 2 which is very inexpensive and has a high efficiency.

Figure 3:
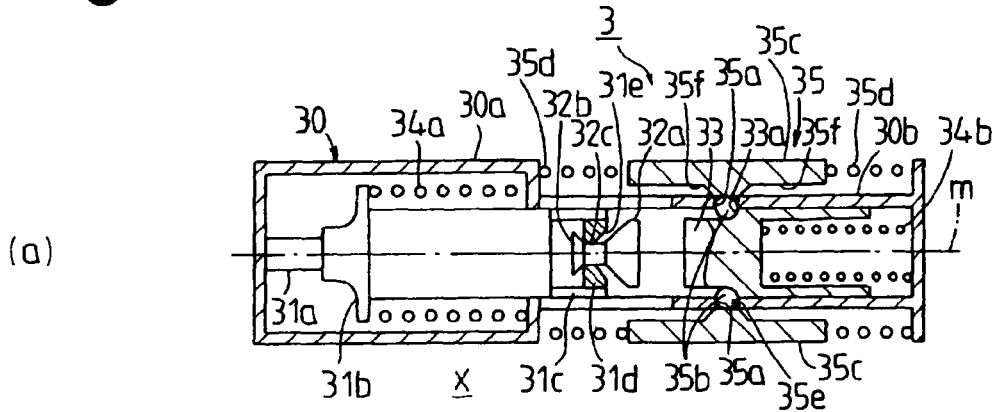
Figure 3:
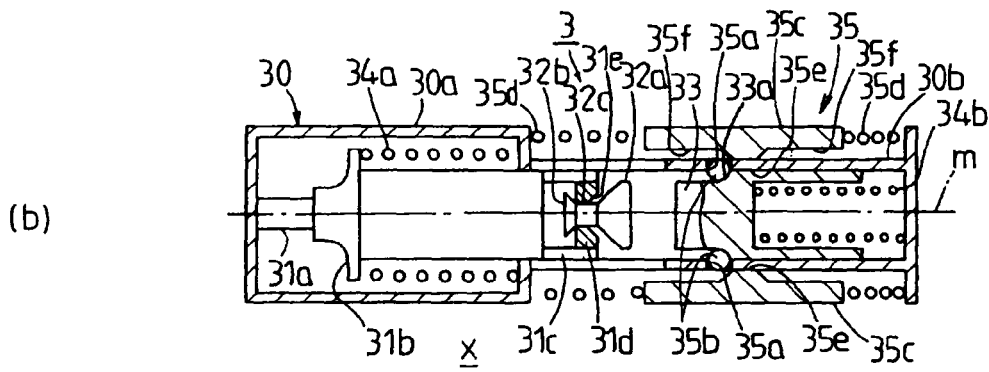
Figure 3:
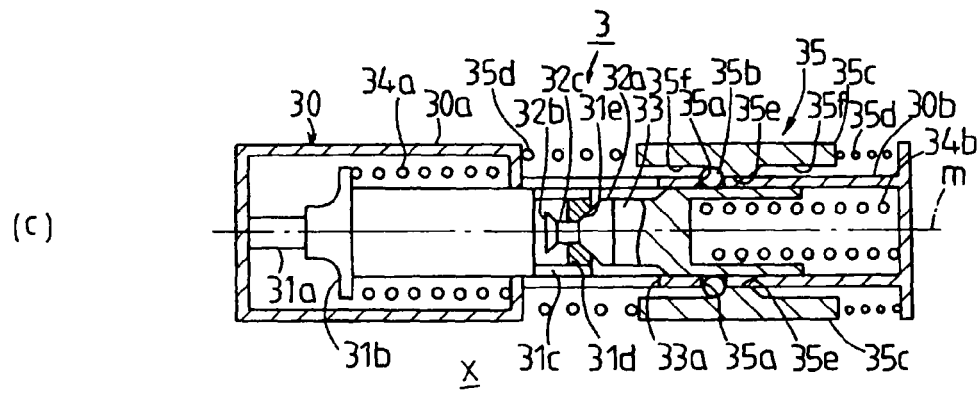
Figure 3:
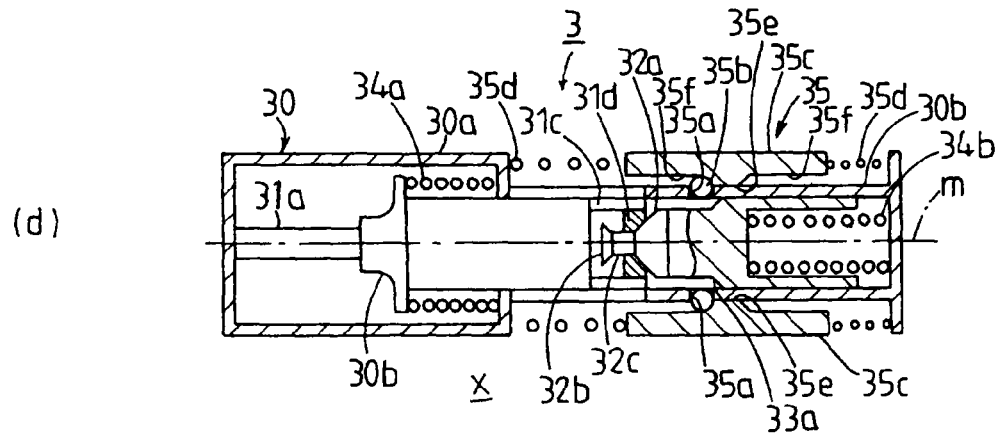

Next, a description will be given of a second embodiment in accordance with the present invention with reference to FIGS. 2 and 3.

In the second embodiment, the structure of the nucleation device is changed. The other structures other than the nucleation device are the same as the first embodiment mentioned above. The same reference numerals are attached to the same portion and a detailed description thereof will be omitted.

In other words, in the present embodiment, as shown in FIGS. 3(a) to 3(d), the nucleation device 3 is arranged in the interior of the heat storage material accommodating container 14.

In a state in which the nucleation device 3 is attached to the heat storage material accommodating container 14, one end (a left side in FIG. 3) in the direction of the axis m is positioned in an upper side, and the other end (a right side in FIG. 3) in the direction of the axis m is positioned in a lower side. The nucleation device 3 is provided with: an outer frame 30 of which one end corresponding to one end in the direction of the axis m (hereinafter, refer simply to as the one end) is formed as a large-diameter portion 30a having a large diameter, and the other end corresponding to an opposite end in the direction of the axis m (hereinafter, refer simply to as the opposite end) is formed as a small-diameter portion 30b having a small diameter; a shaft member 31a protruding toward the opposite end on the axis m in an end corresponding to the one end within the large-diameter portion 30a of the outer frame 30; a cylindrical piston member 31b with a closed end supported to the shaft member 31a so as to be slidable in the direction of the axis m and having an end of the outer peripheral surface corresponding to the opposite end being slidably supported to the inner peripheral surface of the small-diameter portion 30b; a support arm 31c provided in a protruding manner in the end of the piston member 31b corresponding to the opposite end and having an outer peripheral portion being slidably supported to an inner peripheral surface of the small-diameter portion 30b; an annular target supporting portion 31d fixedly provided in a distal end of the support arm 31c and supporting a pivot portion 32c of an internal thread shaped target main body 32a and an external thread shaped target supporting body 32b engaging with each other from the direction of the axis m so as to be slidable in the direction of the axis m; a hammer 33 supported to the end within the small-diameter portion 30b of the outer frame 30 corresponding to the opposite end so as to be slidable in the direction of the axis m, and serving as a shaft bringing a end surface corresponding to the one end into contact with the end surface corresponding to the opposite end of the target main body 32a; a first urging spring 34a urging the piston member 31b toward the opposite end; and a second urging spring 34b provided in a compressed manner between the hammer 33 and the small-diameter portion 30b of the outer frame 30 and urging the hammer 33 to the one end (the target main body 32a side). Further, a tapered seat surface 31e seating a portion near a center portion of end surface of the target main body 32a corresponding to the one end on the basis of a contact with the hammer 33 is provided near a center portion of the surface of the target supporting portion 31d corresponding to the opposite end. The portion substantially near the center portion in the direction of the axis m of the outer frame 30 is formed as a fence shape, and is structured such that the end of the piston member 31b corresponding to the opposite end and the end of the hammer 33 corresponding to the one end communicate with the interior of the heat storage material accommodating container 14, and the target main body 32a, the target supporting body 32b, the pivot portion 32c and the target supporting portion 31d directly come into contact with the heat storage material X.

The thermowax fills the piston member 31b. Further, the thermowax within the piston member 31b increases its volume at a warm time (for example, 60° C. or higher), moves the piston member 31b toward the opposite end while pushing out the shaft member 31a against an urging force of the first urging spring 34a, and moves the hammer 33 in the contact state to the position at the warm time of the thermowax, that is, a warm hammer position (a position shown in FIG. 3(d)) against an urging force of the second urging spring 34b. On the other hand, the thermowax within the piston member 31b reduces its volume at a cold time (for example, 50° C. or lower), and moves the piston member 31b toward the one end while pulling in the shaft member 31a in cooperation with the urging force of the first urging spring 34a.

Further, the nucleation device 3 is provided with a release mechanism 35 constraining the hammer 33 at the warm hammer position in a releasable state even at the warm time of the thermowax. The release mechanism 35 is provided with: the second urging spring 34b urging the hammer 33 toward a cold hammer position (a left side in FIG. 3); a locking ball 35b slidably supported within a through hole 35a passing through a portion substantially near a center portion in the direction of the axis m of the small-diameter portion 30b of the outer frame 30 in a radial direction which is orthogonal to the axis m, and locking the hammer 33 to the warm hammer position on the basis of an engagement with a shoulder portion 33a having a small diameter; and an substantially cylindrical canceling member 35c held in balance in the outside of the small-diameter portion 30b of the outer frame 30 in a state of being movable in the direction of the axis m by an urging force of a pair of urging springs 35d and 35d in a side corresponding to the one end and a side corresponding to the opposite end, and canceling the engagement with the hammer 33 by releasing the locking ball 35b to the outside in the radial direction via the through hole 35a on the basis of the oscillation generated at a time of starting the internal combustion engine 1. The canceling member 35c is provided with a projection 35e holding down the locking ball 35b at a balanced position by each of the urging springs 35d and 35d, and the projection 35e is structured such as to slide on an outer peripheral surface of the small-diameter portion 30b of the outer frame 30. Further, the canceling member 35c is provided with a canceling groove 35f canceling the engagement with the hammer 33 by releasing the locking ball 35b to the outer side in the radial direction via the through hole 35a at a time when the balanced state by each of the urging springs 35d and 35d is canceled by the oscillation generated at a time of starting the internal combustion engine 1, in each of one side corresponding to the one end and the other end corresponding to the opposite end of the projection 35e, as shown in FIG. 3(d).

Further, the pivot portion 32c of the target supporting body 32b is structured such as to slide to a position corresponding to the one end, seating the target main body 32a to the seat surface 31e of the target supporting portion 31d at a time when the hammer 33 is brought into contact with the target main body 32a, as shown in FIGS. 3(c) and 3(d), and slide to a position corresponding to the opposite end, at which the target main body 32a is moved away from the seat surface 31e of the target supporting portion 31d on the basis of its own weight of the target main body 32a at a time when the hammer 33 is disconnected from the target main body 32a. A crystal body generated by the phase change of the heat storage material X is left between the pivot portion 32c of the target supporting body 32b sliding as mentioned above and the inner peripheral surface of the target supporting portion 31d. Further, if the release mechanism 35 cancels the balanced state by each of the urging springs 35d and 35d on the basis of the oscillation generated at a time of starting the internal combustion engine 1 and the engagement between the locking ball 35b and the shoulder portion 33a of the hammer 33 is canceled, the pivot portion 32c of the target supporting body 32b slides toward the end position corresponding to the one end at a time when the hammer 33 released from the warm hammer position is forward moved to the cold hammer position so as to be brought into contact with the target main body 32a, and the nucleation device 3 is operated in such a manner that the crystal body of the heat storage material X left between the pivot portion 32c of the sliding target supporting body 32b and the inner peripheral surface of the target supporting portion 31d directly comes into contact with the heat storage material X so as to nucleate the heat storage material X. The phase change to the solid phase of the heat storage material X is prompted by the operation of the nucleation device 3, and the latent heat is quickly discharged to the cylinder block 11. In this case, the nucleation device 3 is attached by extending the axis m substantially in the vertical direction in such a manner as to be oriented to a direction facilitating the cancellation of the constraint at the warm hammer position of the hammer 33 by the release mechanism 35 on the basis of the oscillation generated at a time of starting the internal combustion engine 1, that is, a direction in which the balanced state by each of the urging springs 35d and 35d is canceled on the basis of the oscillation generated at a time of starting the internal combustion engine 1 and the canceling member 35c tends to move in the axial direction.

Further, if the nucleation device 3 incorporates the heat from the cylinder block 11 and the heat storage material X is at a temperature more than the melting point (58° C.), from a state in which the nucleation device 3 changes the phase of the heat storage material X to the solid phase after the operation of forward moving the hammer 33 to the cold hammer position, as shown in FIG. 3(c), the temperature of the thermowax within the piston member 31b rises and the volume is increased thereby moving the piston member 31b toward the opposite end while pushing out the shaft member 31a, moving the hammer 33 to a warm hammer position (a position shown in FIG. 3(d)) against the urging force of the second urging spring 34b, and moving the target main body 32a away from the seat surface 31e of the target supporting portion 31d on the basis of its own weight, as shown in FIG. 3(d). At this time, the locking ball 35b is expelled from the canceling groove 35f on the inner peripheral surface of the outer frame 30 so as to be returned into the through hole 35a of the small-diameter portion 30b of the outer frame 30, the shoulder portion 33a of the hammer 33 moved to the warm hammer position and the locking ball 35b engage with each other, and the constraint at the warm hammer position of the hammer 33 is carried out by the release mechanism 35. The constraint at the warm hammer position of the hammer 33 by the release mechanism 35 is continuously carried out even if the heat storage material X is lowered to the temperature equal to or lower than 50° C., whereby the temperature of the thermowax within the piston member 31b is lowered and the volume is reduced, and the nucleation device 3 is held in the operation standby state in such a manner that the nucleation device 3 is operated on the basis of the oscillation generated at a time of starting the internal combustion engine 1.

Accordingly, in the second embodiment mentioned above, since the nucleation device 3 operated on the basis of the oscillation generated at a time of starting the internal combustion engine 1 is provided in the interior of the heat storage material accommodating container 14 accommodating the heat storage material X, the through port for inserting the electrode into the heat storage material accommodating container accommodating the heat storage material, the electric circuit for applying the electric voltage to the electrode and the like are not necessary as is different from the structure which prompts the phase change of the heat storage material by applying the electric voltage to the electrode inserted to the heat storage material under the supercooled state from the external portion. Accordingly, the machining operation for forming the through port in the heat storage material accommodating container 14 and the seal around the through port are not necessary, and it is possible to provide the warming-up device 1 which is inexpensive and has a simple structure.

Further, the nucleation device 3 is provided with the release mechanism 35 constraining the hammer 33 at the warm hammer position (the position shown in FIG. 2(a)) even at the cold time of the thermowax within the piston member 31b. If the engagement between the shoulder portion 33a of the hammer 33 and the locking ball 35b in the release mechanism 35 is cancelled by the oscillation generated at a time of starting the internal combustion engine 1, the hammer 33 released from the warm hammer position moves forward to the cold hammer position so as to be brought into contact with the target main body 32a, and the crystal body of the heat storage material X left between the pivot portion 32c of the target supporting body 32b sliding at that time and the inner peripheral surface of the target supporting portion 31d directly comes into contact with the heat storage material X, whereby it is possible to prompt the phase change to the solid phase of the heat storage material X under the supercooled state, and it is possible to securely discharge the latent heat from the heat storage material X to the cylinder block 11.

Further, since the thermowax within the piston member 31b moves the piston member 31b toward the opposite end while pushing out the shaft member 31a at a time of temperature rising on the basis of the temperature rise of the heat storage material X so as to increase the volume, and moves the hammer 33 to the warm hammer position (the position shown in FIG. 3(d)), the locking ball 35b expelled from the canceling groove 35f in the inner peripheral surface of the outer frame 30 is returned into the through hole 35a of the small-diameter portion 30b of the outer frame 30 so as to be engaged with the shoulder portion 33a of the hammer 33 at the warm hammer position, and the hammer 33 is constrained at the warm hammer position by the release mechanism 35, it is possible to independently move the hammer 33 to the warm hammer position constrained by the release mechanism 35 by means of the thermowax heated and inflated by the temperature rise of the heat storage material X, the standby at the warm hammer position of the hammer 33 constrained by the release mechanism 35 is easily obtained by utilizing the heat of the internal combustion engine 1, and it is possible to provide the nucleation device 3 which is very inexpensive and has a high efficiency.

Next, a description will be given of a third embodiment in accordance with the present invention with reference to FIGS. 4 to 6.

In the third embodiment, the structure of the nucleation device is changed. The other structures other than the nucleation device are the same as the case of the first embodiment mentioned above. The same reference numerals are attached to the same portions and a detailed description thereof will be omitted.

Figure 4:
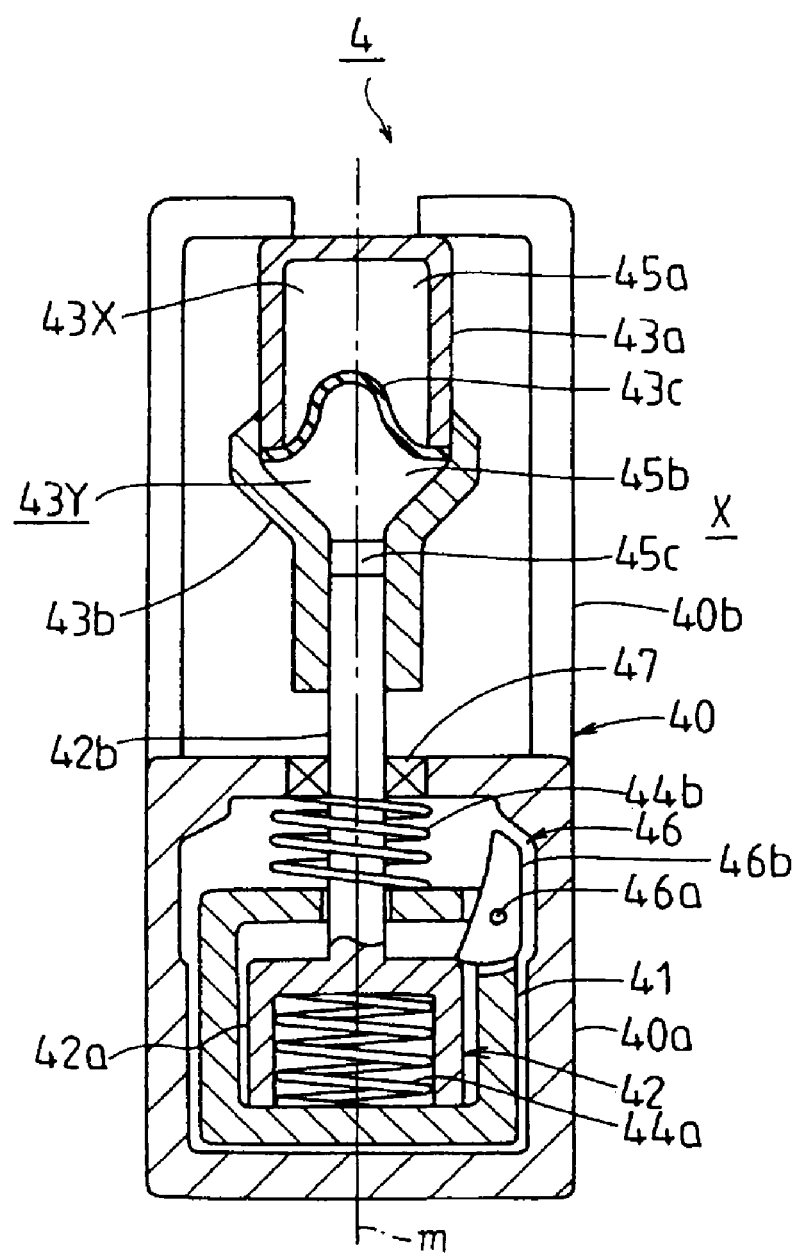
FIG. 4 is a cross-sectional view of a nucleation device in accordance with a third embodiment of the present invention.

In the present embodiment, as shown in FIG. 4, a nucleation device 4 is arranged in the interior of a heat storage material accommodating container 14.

Figure 5:
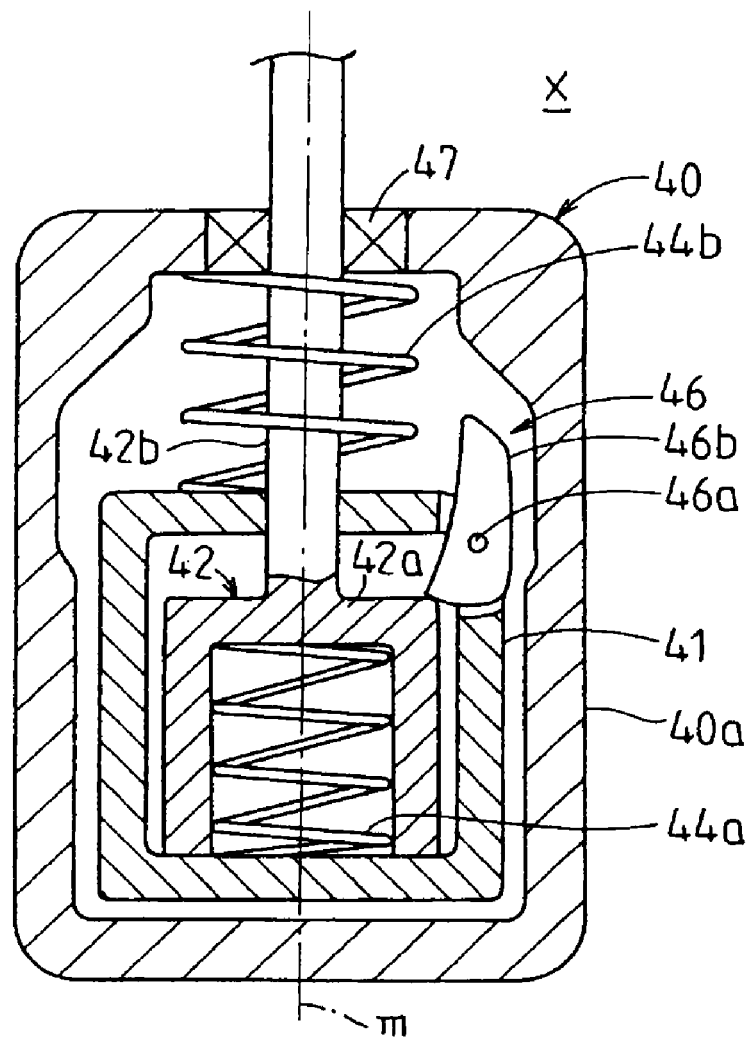
FIG. 5 is a cross-sectional view near a tubular body of the nucleation device in FIG. 4.

The nucleation device 4 is provided with: an outer frame 40 in which a cylindrical tubular body 40a is provided in an end (a lower side in FIG. 4) corresponding to one end in the direction of the axis m, and a fence-shaped surrounding portion 40b (expressed in FIG. 4) is provided in a second end (an upper side in FIG. 4) in the direction of the axis m; a substantially cylindrical inner tube member 41 supported within the tubular body 40a of the outer frame 40 so as to be slidable in the direction of the axis m (a vertical direction in FIG. 4); a slidable member 42 having a tubular piston portion 42a with a closed end supported within the inner tube member 41 so as to be slidable in the direction of the axis m, and integrally forming a shaft portion 42b passing through the inner tube member 41 and the surface of the tubular body 40a corresponding to an opposite end so as to protrude into the surrounding portion 40b in the surface of the piston portion 42a corresponding to the opposite end; a tubular accommodating container 43a with a closed end firmly attached to an end of the surrounding portion 40b of the outer frame 40 corresponding to the opposite end; a tubular member 43b integrally attached to an open end open to the one end in the direction of the axis m (hereinafter, refer simply to as one end) of the accommodating container 43a, and having a distal end portion (the end portion corresponding to the opposite end) of the shaft portion 42b being slidably supported in the interior; a first urging spring 44a provided in a compressed manner within the piston portion 42a, and urging the slidable member 42 (the piston portion 42a and the shaft portion 42b) toward the opposite end; and a second urging spring 44b provided in a compressed manner between the tubular body 40a of the outer frame 40 and the inner tube member 41, and urging the inner tube member 41 toward the one end, as shown in FIG. 5.

An internal space 43X within the accommodating container 43a and an internal space 43Y within the tubular member 43b are partitioned by an elastically deformable rubber member 43c. A thermowax 45a fills the internal space 43X within the accommodating container 43a, and a highly viscous substance 45b fills the internal space 43Y within the tubular member 43b. An end of the internal space 43Y corresponding to the one end within the tubular member 43b is sealed by a seal member 45c integrally provided in the end portion of the shaft portion 42b corresponding to the opposite end, thereby sealing the highly viscous substance 45b from leaking out from the interior (the internal space 43Y) within the tubular member 43b. Further, the thermowax 45a within the accommodating container 43a is structured such as to increase its volume so as to push out the end portion of the shaft portion 42b corresponding to the opposite end toward the one end with the highly viscous substance 45b and move the slidable member 42 to a position at a warm time of the thermowax 45a, that is, a warm sliding position (a position shown in FIGS. 4 and 5), at a warm time (for example, 60° C. or higher). On the other hand, the thermowax 45a within the accommodating container 43a is structured such as to decrease its volume so as to pull back the end portion of the shaft portion 42b corresponding to the opposite end toward the opposite end with the highly viscous substance 45b and move the slidable member 42 to a position at a cold time of the thermowax 45a, that is, a cold sliding position, at a cold time (for example, 50° C. or lower).

Figure 6:
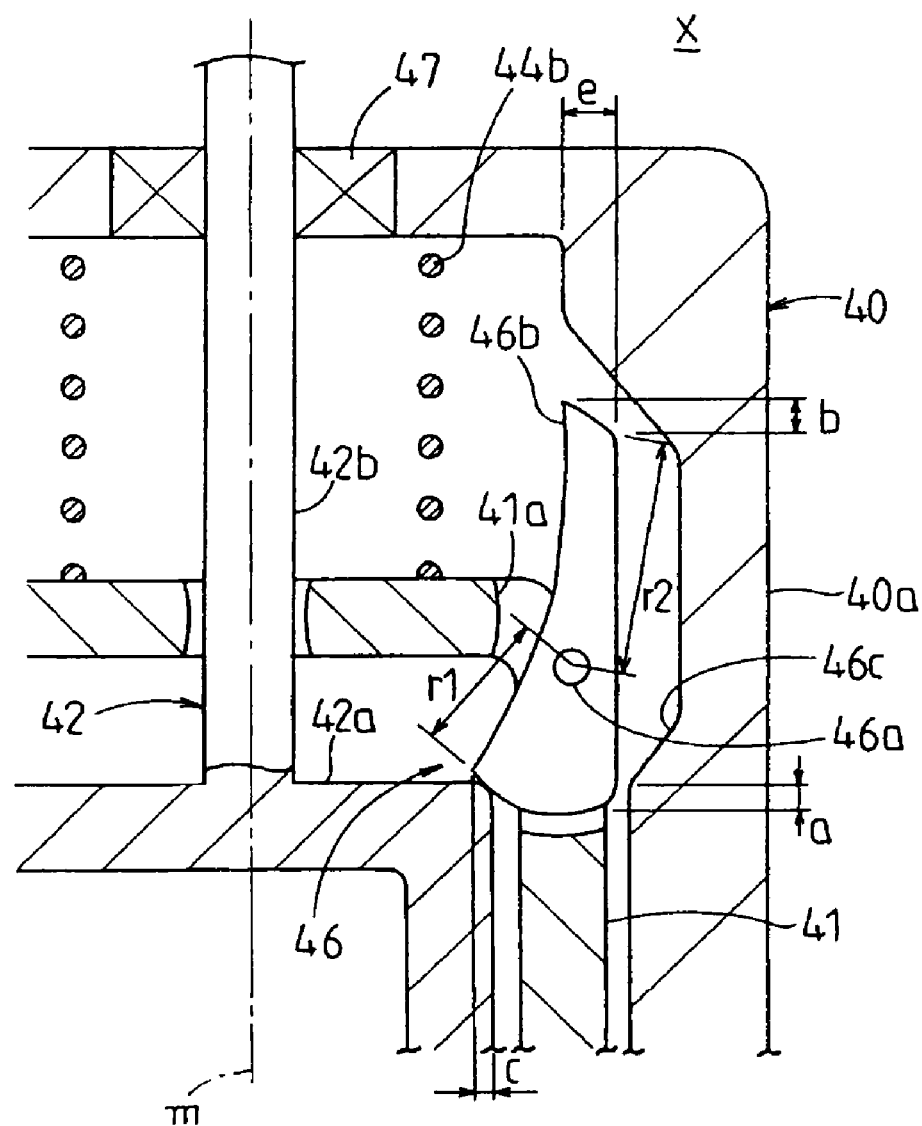
FIG. 6 is a cross-sectional view showing the release mechanism and its surroundings of the nucleation device in FIG. 4.

Further, as shown in FIG. 6, the nucleation device 4 is provided with a release mechanism 46 constraining the slidable member 42 to the warm sliding position in a releasable state even at the cold time of the thermowax 45a. The release mechanism 46 is provided with: a notch portion 41a provided at an outer position in the end of the inner tube member 41 corresponding to the opposite end urged toward the one end (a lower side in FIGS. 4 and 5) by the second urging spring 44b; a release lever 46b supported to the notch portion 41a so as to be rotatable around a pivot 46a and switched to an engagement position engaging with the outer edge of surface of the piston portion 42a corresponding to the opposite end and a cancel position canceling the engagement with the outer surface of the piston portion 42a corresponding to the opposite end; and a canceling recess 46c formed on an inner peripheral surface of the tubular body 40a corresponding to the release lever 46b, and allowing a rotation to the cancel position of the release lever 46b. An interval a between one end (a lower end in FIG. 6) of the release lever 46b corresponding to the one end and one end of the canceling recess 46c corresponding to the one end is set so as to be smaller than an interval b between the end (an upper end in FIG. 6) of the release lever 46b corresponding to the second and the end of the canceling recess 46c corresponding to the opposite end (a<b). Accordingly, if the inner tube member 41 is somewhat moved toward the opposite end from a contact state with the inner wall surface of the tubular body 40a closer to the one end than the canceling recess 46c at the engagement position, the release lever 46b is securely changed to the cancel position without the other end (the upper end in FIG. 6) interfering with the end of the canceling recess 46c corresponding to the opposite end. Further, the product (e·r2) of a dimension e between an outer edge in a radial direction of the end of the release lever 46b corresponding to the opposite end at the engagement position and an inner peripheral surface of the tubular body 40a, and a dimension r2 between a center of the pivot 46a and the outer edge in the radial direction of the end of the release lever 46b corresponding to the opposite end is set so as to become larger than a product (c·r1) between a dimension c between an inner edge in the radial direction of the end of the release lever 46b corresponding to the one end at the engagement position and the outer edge of the surface of the piston portion 42a corresponding to the opposite end, and a dimension r1 between the center of the pivot 46a and the inner edge in the radial direction of the end of the release lever 46b corresponding to the one end (e·r2>c·r1). Accordingly, if the inner tube member 41 is somewhat moved toward the opposite end from the contact state with the inner wall surface of the tubular body 40a closer to the one end than the canceling recess 46c at the engagement position, the release lever 46b is securely changed to the cancel position without the other end interfering with the end of the canceling recess 46c corresponding to the opposite end.

Further, as shown in FIG. 4, the interior of the surrounding portion 40b communicates with the interior of the heat storage material accommodating container 14, whereby the shaft portion 42b exposed between the tubular body 40a and the tubular member 43b directly comes into contact with the heat storage material X. Further, an annular rubber scraping member 47 is attached around a through hole through which the shaft portion 42b passes in the end of the tubular body 40a corresponding to the opposite end. The annular rubber scraping member 47 scrapes a surface of the shaft portion 42b at a time when the slidable member 42 moves forward and backward in the direction of the axis m while coming close contact with the shaft portion 42b. Further, in the release mechanism 46, if the inner tube member 41 moves toward the opposite end by a slight amount against the urging force of the second urging spring 44b on the basis of the oscillation generated at a time of starting the internal combustion engine 1 and the release lever 46b rotates to the cancel position canceling the engagement with the outer edge of the surface of the piston portion 42a corresponding to the opposite end, the surface of the shaft portion 42b is scraped by the rubber scraping member 47 at a time when the slidable member 42 released from the warm sliding position moves forward to the cold sliding position, and the nucleation device 4 is operated so as to nucleate the heat storage material X, by directly bringing the newly scraped surface into contact with the heat storage material X in the supercooled state. The phase change to the solid phase of the heat storage material X is prompted by the operation of the nucleation device 4, and the latent heat is quickly discharged to the cylinder block 11. In this case, the nucleation device 4 is attached by extending the axis m substantially in the vertical direction in such a manner as to be oriented to a direction facilitating the cancellation of the constraint at the warm sliding position of the slidable member 42 by the release mechanism 46 on the basis of the oscillation generated at a time of starting the internal combustion engine 1, that is, a direction at which the inner tube member 41 moves toward the opposite end by a slight amount against the urging force of the second urging spring 44b on the basis of the oscillation generated at a time of starting the internal combustion engine 1 and the release lever 46b tends to rotate to the cancel position.

Further, if the heat storage material X incorporates the heat from the cylinder block 11 thereinto so as to be at a temperature more than the melting point (58° C.), from a state in which the nucleation device 4 changes the phase of the heat storage material X to the solid phase so as to discharge the latent heat after the operation of moving forward the slidable member 42 to the cold sliding position, the thermowax 45a within the accommodating container 43a is heated so as to push out the end portion of the shaft portion 42b corresponding to the opposite end toward the one end with the highly viscous substance 45b and move the slidable member 42 to the warm sliding position (the position shown in FIGS. 4 and 5) at a time of increasing its volume. At this time, the release lever 46b is expelled from the canceling recess 46c so as to be rotated to the engagement position, the release lever 46b rotated to the engagement position is engaged with the outer edge of the surface of the piston portion 42a of the slidable member 42 corresponding to the opposite end at the warm sliding position, and the constrain at the warm sliding position of the slidable member 42 is achieved by the release mechanism 46. The constraint at the warm sliding position of the slidable member 42 by the release mechanism 46 is continuously carried out even if the volume is decreased due to the temperature decrease of the thermowax 45a within the accommodating container 43a at a time when the heat storage material X is lowered to a temperature equal to or lower than 50° C. so as to act to pull back the end portion of the shaft portion 42b corresponding to the opposite end toward the opposite end with the highly viscous substance 45b. Accordingly, it is possible to hold in an operation standby state so that the nucleation device 4 is operated on the basis of the vibration generated at a time of starting the internal combustion engine 1.

Accordingly, in the third embodiment, since the nucleation device 4 operating on the basis of the oscillation generated at a time of starting the internal combustion engine 1 is provided in the interior of the heat storage material accommodating container 14 accommodating the heat storage material X, the through port for inserting the electrode into the heat storage material accommodating container accommodating the heat storage material, the electric circuit for applying the electric voltage to the electrode and the like are not necessary as is different from the structure which prompts the phase change of the heat storage material by applying the electric voltage to the electrode inserted to the heat storage material under the supercooled state from the external portion. Accordingly, the machining operation for forming the through port in the heat storage material accommodating container 14 and the seal around the through port are not necessary, and it is possible to provide the warming-up device 1 which is inexpensive and has a simple structure.

Further, the nucleation device 4 is provided with the release mechanism 46 constraining the slidable member 42 at the warm sliding position (the position shown in FIGS. 4 and 5) even at the cold time of the thermowax 45a. If the release lever 46b of the release mechanism 46 is rotated to the cancel position canceling the engagement with the outer surface of the piston portion 42a of the slidable member 42 corresponding to the opposite end by the oscillation generated at a time of starting the internal combustion engine 1, the surface of the shaft portion 42b is scraped by the rubber scraping member 47 at a time when the slidable member 42 released from the warm sliding position moves forward to the cold sliding position, it is possible to prompt the phase change to the solid phase of the heat storage material X under the supercooled state by directly bringing the newly scraped surface into contact with the heat storage material X, and it is possible to securely discharge the latent heat from the heat storage material X to the cylinder block 11.

Further, since the thermowax 45a within the accommodating container 43a pushes out the end portion of the shaft portion 42b corresponding to the opposite end toward the one end with the highly viscous substance 45b so as to move the slidable member 42 to the warm sliding position at a time of temperature rising on the basis of the temperature rise of the heat storage material X so as to increase the volume, the release lever 46b expelled from the canceling recess 46c is rotated to the engagement position, the release lever 46b rotated to the engagement position is engaged with the outer surface of the piston portion 42a of the slidable member 42 corresponding to the opposite end at the warm sliding position, and the slidable member 42 is constrained at the warm sliding position by the release mechanism 46, it is possible to independently move the slidable member 42 to the warm sliding position constrained by the release mechanism 51 by means of the thermowax 45a heated and inflated by the temperature rise of the heat storage material X, the warm sliding position of the slidable member 42 constrained by the release mechanism 51 is easily obtained by utilizing the heat of the internal combustion engine 1, and it is possible to provide the nucleation device 4 which is very inexpensive and has a high efficiency.

Next, a description will be given of a fourth embodiment in accordance with the present invention with reference to FIG. 7.

In the fourth embodiment, the structure of the release mechanism is changed. The other structures other than the release mechanism are the same as the case of the third embodiment. The same reference numerals are attached to the same portions and a detailed description thereof will be omitted.

Figure 7:
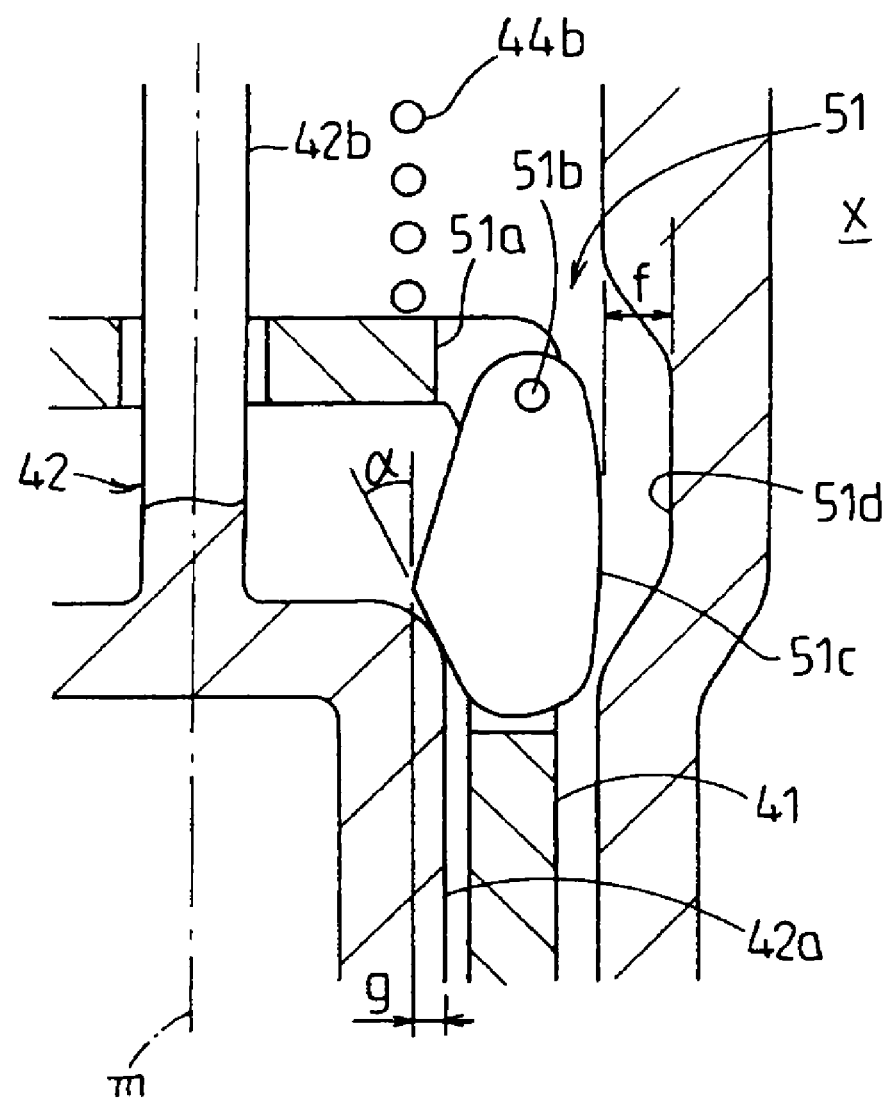
FIG. 7 is a cross-sectional view of a release mechanism in accordance with a fourth embodiment of the present invention.

In other words, in the present embodiment, as shown in FIG. 7, the release mechanism 51 is provided with: a notch portion 51a provided at the end outer position of the inner tube member 41 corresponding to the opposite end urged toward the one end (a lower side in FIG. 7) by the second urging spring 44b; a release lever 51c supported to the notch portion 51a so as to freely oscillate around a pivot 51b corresponding to a supporting point, and switched to an engagement position at which the end inner position corresponding to the one end is engaged with the outer edge of the surface of the piston portion 42a corresponding to the opposite end and a cancel position canceling the engagement with the outer edge of the surface of the piston portion 42a corresponding to the opposite end; and a canceling recess 51d formed on an inner peripheral surface of the tubular body 40a corresponding to the release lever 51c and allowing a rotation of the release lever 51c to the cancel position. A dimension f between an outer edge of the release lever 51c existing at the engagement position and a bottom portion of the canceling recess 51d is set in such a manner as to become larger than a dimension g between an inner edge of the release lever 51c existing at the engagement position and the outer edge of the surface of the piston portion 42a corresponding to the opposite end (f>g), and an inclination angle α with respect to a vertical line h of an outer edge of the release lever 51c existing at the engagement position is set smaller than a friction force of the outer edge of the surface of the piston portion 42a corresponding to the opposite end at a canceling time with respect to the release lever 51c, whereby if the inner tube member 41 is somewhat moved toward the opposite end from the contact state with the inner wall surface of the tubular body 40a closer to the one end than the canceling recess 51d at the engagement position, the outer edge of the surface of the piston portion 42a corresponding to the opposite end is slid with respect to a slant surface in an outer end of the release lever 51c, and the release lever 51c is securely converted to the cancel position.

Further, in the release mechanism 51 the inner tube member 41 is moved toward the opposite end at a small amount against the urging force of the second urging spring 44b on the basis of the oscillation generated at a time of starting the internal combustion engine 1 and the release lever 51c is rotated to the cancel position canceling the engagement with the outer edge of the surface of the piston portion 42a corresponding to the opposite end. Further, if the heat storage material X comes to the temperature more than the melting point (58° C.) by incorporating the heat from the cylinder block 11 from a state of phase changing the heat storage material X to the solid phase after operating the nucleation device 4 forward moving the slidable member 42 to the cold slidable position so as to discharge the latent heat, the volume of the thermowax 45a within the accommodating container 43a is increased so as to push out the end portion of the shaft portion 42b corresponding to the opposite end toward the one end with the highly viscous substance 45b and move the slidable member 42 to the warm sliding position (the position shown in FIGS. 4 and 5). At this time, the release lever 51c is expelled from the canceling recess 51d so as to rotate to the engagement position, and the release lever 51c rotated to the engagement position is engaged with the outer edge of the surface of the piston portion 42a corresponding to the opposite end of the slidable member 42, whereby the constraint at the warm sliding position of the slidable member 42 is carried out by the release mechanism 51. The constraint at the warm sliding position of the slidable member 42 by the release mechanism 51 is continuously carried out even if the heat storage material X is lowered to a temperature equal to or lower than 50° C. and the volume of the thermowax 45a within the accommodating container 43a is reduced so as to pull back the end portion of the shaft portion 42b corresponding to the opposite end toward the opposite end with the highly viscous substance 45b, and is held in the operation standby state in such a manner that the nucleation device 4 is operated on the basis of the oscillation generated at a time of starting the internal combustion engine 1.

Accordingly, in the fourth embodiment, the nucleation device 4 is provided with the release mechanism 51 restricting the slidable member 42 at a warm sliding position (a position shown in FIG. 7) even at the cold time of the thermowax 45a, and if the release lever 51c of the release mechanism 51 is rotated to the cancel position canceling the engagement with the outer edge of surface of the piston portion 42a of the slidable member 42 corresponding to the opposite end on the basis of the oscillation generated at a time of starting the internal combustion engine 1, the surface of the shaft portion 42b is scraped by the rubber scraping member 47 at a time when the slidable member 42 released from the warm sliding position is forward moved to the cold sliding position, it is possible to prompt the phase change of the heat storage material X under the supercooled state to the solid state by directly bringing the newly scraped surface into contact with the heat storage material X, and it is possible to securely discharge the latent heat from the heat storage material X to the cylinder block 11.

Further, since the release lever 51c expelled from the canceling recess 51d is rotated to the engagement position by pushing out the end portion of the shaft portion 42b corresponding to the opposite end toward the one end with the highly viscous substance 45b and moving the slidable member 42 to the warm sliding position at a time when the temperature of the thermowax 45a within the accommodating container 43a is raised so as to increase its volume on the basis of the temperature rise of the heat storage material X, the release lever 51c rotated to the engagement position is engaged with the outer edge of the surface of the piston portion 42a of the slidable member 42 corresponding to the opposite end at the warm sliding position, and the constraint at the warm sliding position of the slidable member 42 is carried out by the release mechanism 51, it is possible to provide the nucleation device 4 which can independently move the slidable member 42 to the warm slidable position constrained by the release mechanism 51 by means of the thermowax 45a which is heated and inflated by the temperature rise of the heat storage material X, can easily obtain the warm sliding position of the slidable member 42 constrained by the release mechanism 51 by utilizing the heat of the internal combustion engine 1, is very inexpensive and has a high efficiency.

Next, a description will be given of a fifth embodiment in accordance with the present invention with reference to FIG. 8.

In the fifth embodiment, the structure of the release mechanism is changed. The other structures other than the release mechanism are the same as the case of the third embodiment. The same reference numerals are attached to the same portions and a detailed description thereof will be omitted.

Figure 8:
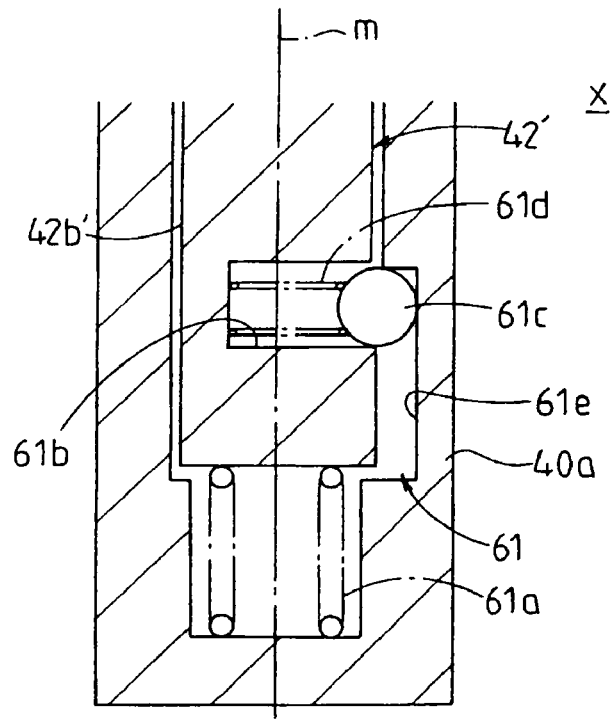
FIG. 8 is a cross-sectional view of a release mechanism in accordance with a fifth embodiment of the present invention.

In the present embodiment, as shown in FIG. 8, a release mechanism 61 is provided with: a first urging spring 61a serving as a first urging portion, which is provided in an end portion of a rod-like shaft portion 42b' having no piston portion 42a at an end portion corresponding to the one end, and urges the slidable member 42' (the shaft portion 42b') toward a cold sliding position side (a shaft position side at a cold time of the thermowax 45a) of the slidable member 42'; a recess 61b, which is formed within an end portion of the shaft portion 42b' corresponding to the one end and extends in a radial direction (an inside and outside direction) orthogonal to the axis m; a locking ball 61c serving as a sealing member which is movable forward and backward toward the inside and outside direction within the recess 61b; a second urging spring 61d serving as a second urging portion, which urges the locking ball 61c in an outer direction of projecting from the interior of the recess 61b of the shaft portion 42b'; and a locking recess 61e, which is formed on an inner peripheral surface of the tubular body 40a of the outer frame 40 corresponding to the locking ball 61c, and serves as a locking portion in which the locking ball 61c urged to an outer direction (a projecting direction) by the second urging spring 61d is engaged at the warm sliding position (the shaft position at the warm time of the thermowax 45a) of the slidable member 42' so as to lock the slidable member 42'. In this case, the inner tube member 41 is omitted.

Further, in the release mechanism 61, if the first urging spring 61a is expanded and contracted in the direction of the axis m on the basis of the oscillation generated at a time of starting the internal combustion engine 1, the slidable member 42 is oscillated, the locking ball 61c is oscillated in the inside and outside direction against the urging force of the second urging spring 61d and unlocked from the locking recess 61e, the surface of the shaft portion 42b' is scraped by the rubber scraping member 47 at a time when the slidable member 42' released from the warm sliding position is moved forward to the cold sliding position, and the newly scraped surface is directly brought into contact with the heat storage material X in the supercooled state, whereby the nucleation device 4 is operated in such a manner as to nucleate the heat storage material X. On the basis of the operation of the nucleation device 4, the phase change to the solid phase of the heat storage material X is prompted, and the latent heat can be quickly discharged to the cylinder block 11. In this case, the nucleation device 4 is attached by extending the axis m substantially in the vertical direction so as to be oriented to the direction which tends to cancel the constraint at the warm sliding position of the slidable member 42 by the release mechanism 46 on the basis of the oscillation generated at a time of starting the internal combustion engine 1, that is, the direction in which the slidable member 42' tends to oscillate in the direction of the axis m on the basis of the oscillation generated at a time of starting the internal combustion engine 1.

Further, if the heat storage material X comes to a temperature more than the melting point (58° C.) by incorporating the heat from the cylinder block 11 from the state of changing the phase of the heat storage material X to the solid phase so as to discharge the latent heat after operating the nucleation device 4 forward moving the slidable member 42' to the cold slidable position, the volume of the thermowax 45a within the accommodating container 43a is increased so as to push out the end portion of the shaft portion 42b' corresponding to the opposite end toward the one side via the highly viscous substance 45b and move the slidable member 42' to a warm sliding position (a position shown in FIG. 8). At this time, the locking ball 61c urged by the second urging spring 61d is engaged with the locking recess 61e, and the constraint at the warm sliding position of the slidable member 42' is carried out by the release mechanism 61. The constraint at the warm sliding position of the slidable member 42' by the release mechanism 61 is continuously carried out even if the heat storage material X is lowered to the temperature equal to or lower than 50° C. and the volume of the thermowax 45a within the accommodating container 43a is reduced so as to act to pull back the end portion of the shaft portion 42b' corresponding to the opposite end with the highly viscous substance 45b, and is held in the operation standby state in such a manner that the nucleation device 4 is operated on the basis of the oscillation generated at a time of starting the internal combustion engine 1.

Accordingly, in the fifth embodiment mentioned above, the nucleation device 4 is provided with the release mechanism 61 constraining the slidable member 42' to the warm sliding position (the position shown in FIG. 8) even at the cold time of the thermowax 45*a*. If the locking with the locking recess 61*e* by the locking ball 61*c* of the release mechanism 61 is canceled on the basis of the oscillation generated at a time of starting the internal combustion engine 1, the surface of the shaft portion 42*b*' is scraped by the rubber scraping member 47 at a time when the slidable member 42' released from the warm sliding position is moved forward to the cold sliding position, it is possible to prompt the phase change to the solid phase of the heat storage material X under the supercooled state by directly brining the newly scraped surface into contact with the heat storage material X, and it is possible to securely discharge the latent heat from the heat storage material X to the cylinder block 11.

Further, since the thermowax 45*a* within the accommodating container 43*a* pushes out the end portion of the shaft portion 42*b*' corresponding to the opposite end toward the one end with the highly viscous substance 45*b* so as to move the slidable member 42' to the warm sliding position at a time of temperature rising so as to increase the volume on the basis of the temperature rise of the heat storage material X, the locking ball 61*c* urged by the second urging spring 61*d* is engaged with the locking recess 61*e*, and the constraint at the warm sliding position of the slidable member 42 is carried out by the release mechanism 61, it is possible to independently move the slidable member 42' to the warm sliding position which is constrained by the release mechanism 61 by means of the thermowax 45*a* heated by the temperature rise of the heat storage material X so as to be inflated, the warm sliding position of the slidable member 42' constrained by the release mechanism 61 is easily obtained by utilizing the heat of the internal combustion engine 1, and it is possible to provide the nucleation device 4 which is very inexpensive and has a high efficiency.

Figure 9:
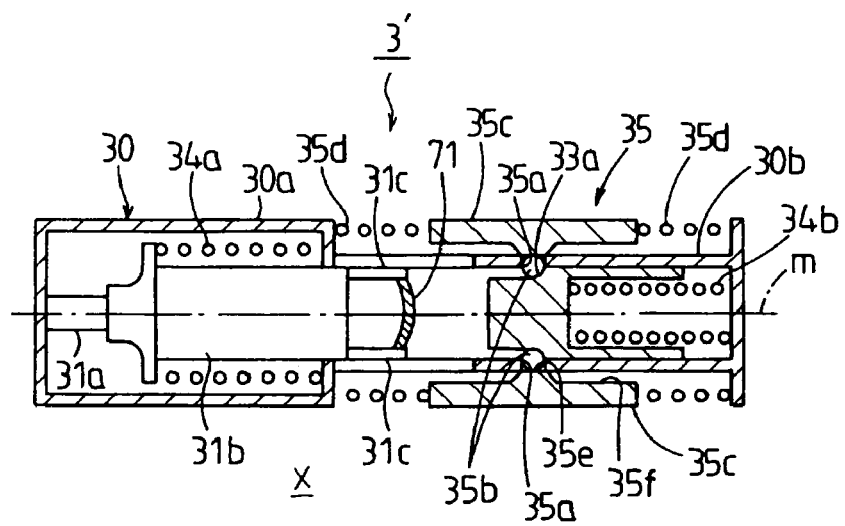
FIG. 9 is a cross-sectional view of a nucleation device in accordance with a modified embodiment of the present invention.

It should be noted that, the present invention is not limited to each of the embodiments mentioned above, but includes various modified embodiments additionally. For example, in the second embodiment mentioned above, the structure is made such as to move forward the hammer 33 released from the warm hammer position to the cold hammer position so as to bring into contact with the target main body 32*a*, thereby directly bringing the crystal body of the heat storage material X staying between the pivot portion 32*c* of the target supporting body 32*b* sliding at that time and the inner peripheral surface of the target supporting portion 31*d* into contact with the heat storage material X. However, the structure may be made, as shown in FIG. 9, such that a bowl-shaped target 71 protruding toward the hammer 33 is fixedly provided in a distal end of the support arm 31*c* in the end of the piston member 31*b* corresponding to the opposite end, a plurality of cracks sealing the crystal body of the heat storage material X in the interior thereof are provided in a side surface of the opposite hammer 33 (the piston member 31*b* side) of the target 71, the hammer 33 released from the warm hammer position moves forward to the cold hammer position so as to be brought into contact with the target 71 if the engagement between the shoulder portion 33*a* of the hammer 33 and the locking ball 35*b* in the release mechanism 35 is canceled by the oscillation generated at a time of starting the internal combustion engine, the crack on the back surface (side surface facing the opposite hammer 33) of the target 71 is opened at that time and the crystal body of the heat storage material X staying in the interior of the crack directly comes into contact with the heat storage material X, or the newly formed metal surface within the crack directly comes into contact with the heat storage material X, thereby nucleating the heat storage material X.

Further, in each of the embodiments mentioned above, the structure is made such that the constraint by the release mechanism 26, 35, 46, 51 or 61 is carried out by moving the shaft 23, the hammer 33 or the slidable member 42 to the warm shaft position, the warm hammer position or the warm sliding position on the basis of the volume increase of the thermowax 25*a* or 45*a*. However, the structure may be made such that an urging spring moving the shaft, the hammer or the slidable member to the warm shaft position, the warm hammer position or the warm sliding position is constructed by a shape memory alloy, and the shaft, the hammer or the slidable member moved to the warm shaft position, the warm hammer position or the warm sliding position by the urging spring is constrained by the release mechanism.

Further, in each of the embodiments, the heat storage material accommodating container 14 is arranged within the water jacket 13. However, the structure may be made such that a dedicated accommodating chamber is formed in the cylinder block and the heat storage material accommodating container is arranged in the accommodating chamber.

The invention claimed is:

1. A warming-up device of an internal combustion engine, comprising:
 a latent heat storage material accommodated in an interior of the internal combustion engine and radiating heat on a basis of a phase change; and
 a nucleation device provided within the heat storage material and operating in such a manner as to prompt the phase change of the heat storage material under a supercooled state,
 wherein the nucleation device is operated by an oscillation generated at a time of starting the engine.

2. The warming-up device according to claim 1, wherein the nucleation device includes:
 a shape memory alloy, a shape of which is different between a cold time and a warm time of the engine, and
 a release mechanism constraining at the cold time the shape of the shape memory alloy at the warm time in a releasable state, and
 wherein the nucleation device is operated when the release mechanism releases the constraint of the shape memory alloy on the basis of the oscillation generated at the time of starting the engine.

3. The warming-up device according to claim 1, wherein the nucleation device includes:
 a shaft which is movable forward and backward in an axial direction,
 a thermowax which, at the cold time of the thermowax, moves the shaft to different positions between a cold time and a warm time, and
 a release mechanism constraining the shaft at the position at the warm time in a releasable state, and
 wherein the nucleation device is operated when the release mechanism releases the constraint of the shaft on the basis of the oscillation generated at the time of starting the engine.

4. The warming-up device according to claim 3, wherein the nucleation device further includes a scraping member scraping a surface of the shaft at a time when the shaft is released and moves to the position at the cold time, and wherein the nucleation device is operated when a surface of the shaft scraped by the scraping member directly comes into contact with the heat storage material under a supercooled state.

5. The warming-up device according to claim 4, wherein the release mechanism further includes:
- a first urging portion urging the shaft toward a position at the cold time of the thermowax,
- a sealing member provided within the shaft and movable forward and backward in a direction orthogonal to the axis of the shaft,
- a second urging portion urging the sealing member in a direction moving forward from an interior of the shaft, and
- a locking portion engaging with the sealing member urged in a forward moving direction by the second urging portion, thereby locking the shaft at the position at the warm time of the thermowax, and
- wherein the locking portion cancels the engagement with the sealing member on the basis of the oscillation generated at the time of starting the engine.

6. The warming-up device according to claim 3, wherein the release mechanism further includes:
- a first urging portion urging the shaft toward a position at the cold time of the thermowax,
- a sealing member provided within the shaft and movable forward and backward in a direction orthogonal to the axis of the shaft,
- a second urging portion urging the sealing member in a direction moving forward from an interior of the shaft, and
- a locking portion engaging with the sealing member urged in a forward moving direction by the second urging portion, thereby locking the shaft at the position at the warm time of the thermowax, and
- wherein the locking portion cancels the engagement with the sealing member on the basis of the oscillation generated at the time of starting the engine.

\* \* \* \* \*